W. F. KASPER.
GAS ENGINE BEARING.
APPLICATION FILED APR. 5, 1919.
1,337,656.
Patented Apr. 20, 1920.
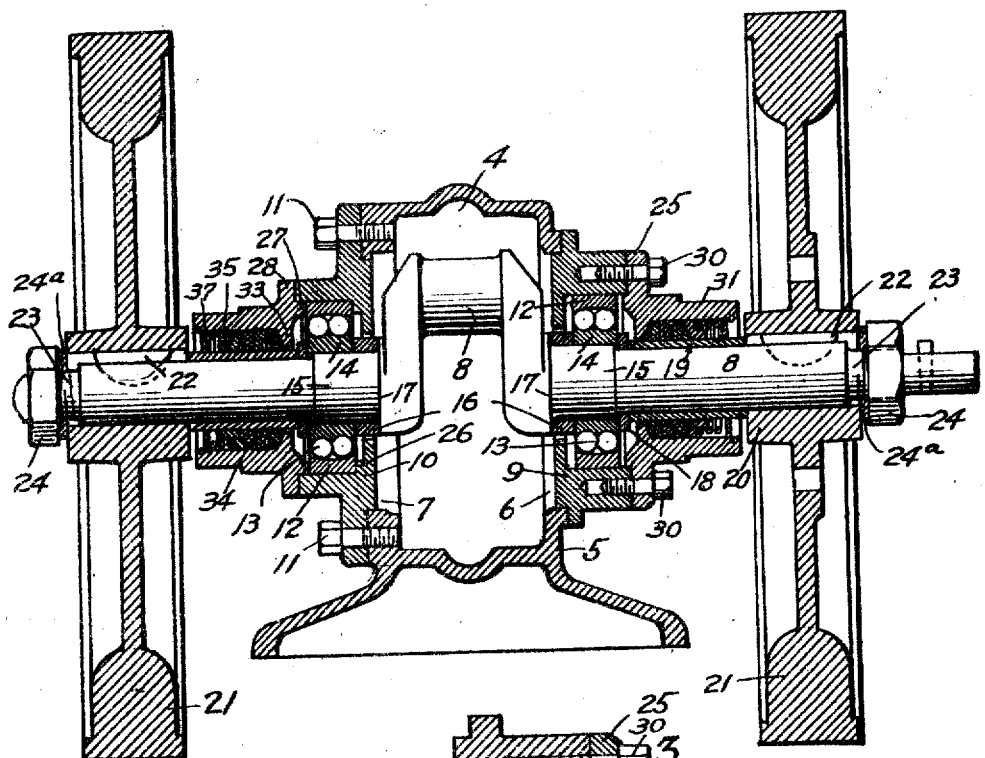
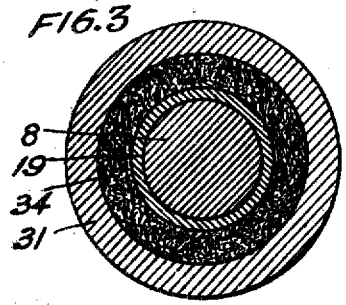
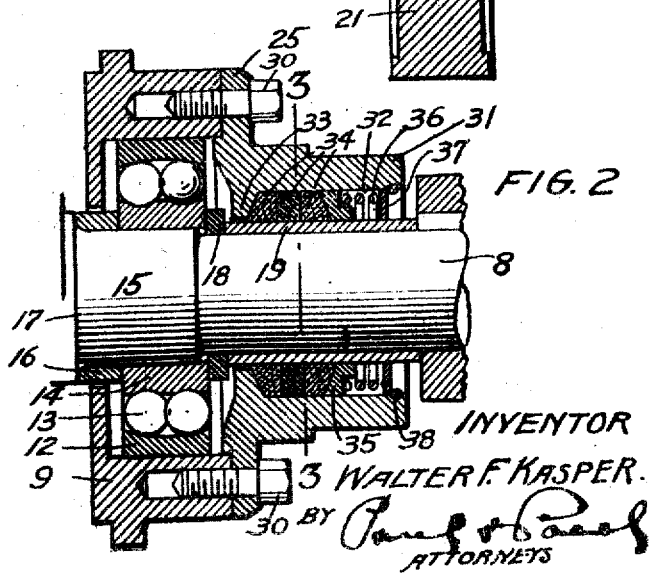
INVENTOR
WALTER F. KASPER.
BY
ATTORNEYS
WITNESS

UNITED STATES PATENT OFFICE.

WALTER F. KASPER, OF FAIRMONT, MINNESOTA, ASSIGNOR TO FAIRMONT GAS ENGINE & RAILWAY MOTOR CAR CO., OF FAIRMONT, MINNESOTA, A CORPORATION.

GAS-ENGINE BEARING.

1,337,656.  Specification of Letters Patent.  Patented Apr. 20, 1920.

Application filed April 5, 1919. Serial No. 287,804.

*To all whom it may concern:*

Be it known that I, WALTER F. KASPER, a citizen of the United States, resident of Fairmont, county of Martin, State of Minnesota, have invented certain new and useful Improvements in Gas-Engine Bearings, of which the following is a specification.

My invention relates in general to anti-friction or rolling bearings for gas engine crank shafts and the object of the invention is to provide gas tight anti-friction bearings for the crank shaft of gas engines and particularly for gas engines of the two-cycle type in which a mixture of hydro-carbon fuel and air is pre-compressed in the crank chamber of the engine. For various reasons it is very important in this class of engines that no leak of air, gas or oil should occur through the bearings around the crank shaft, and it is also very desirable that engines, especially of high speed, should be provided with roller or ball bearings. I therefore provide means in connection with these bearings for rendering impossible the escape of air or gas from the crank chamber to the air even under moderately high compression in the chamber.

My invention consists in certain constructions and combinations hereinafter described and particularly pointed out in the claims, taken in connection with the accompanying drawings in which, Figure 1 is a vertical transverse section of a gas engine through the crank chamber and crank shaft bearings, having my invention applied thereto, Fig. 2 is an enlarged sectional view of a ball bearing having my invention applied thereto, Fig. 3 is a section on the line 3—3 of Fig. 2.

In the drawings, 4 represents the crank chamber of the base 5 of a two-cycle gas engine, having the usual bored and faced openings 6 and 7 through which the crank shaft 8 is admitted. Heads 9 and 10 secured by bolts 11 to the base 5 close the openings 6 and 7 and form air and gas tight joints with the base 5. The heads 9 and 10 are recessed to admit the outer races 12 for the balls 13 and the inner races 14 are fitted snugly around the raised portions 15 of the crank shaft 8. Collars 16 bearing against the crank arm shoulders 17 and washers 18 held in place by the sleeves 19 keep the inner races 14 from lateral movement on the shaft. The sleeves 19 have a pressed air-tight fit on the crank shaft and abut the hubs 20 of the fly wheels 21 which are splined to the crank shaft 8, preferably by keys 22. The reduced ends 23 of the crank shaft are threaded and by means of the threaded nuts 24 and lock washer 24ª, the fly wheels 21, sleeves 19, washers 18, inner ball races 14 and collars 16, may be drawn up snugly and locked in place against the shoulders 17 of the crank shaft. One of the outer ball races 12, preferably the race in the head 10, is held against end thrust by means of the shoulder 26 in the recess of the head 10 and the shoulder 27 in the cover 28. The outer ball race 12 in the head 9 is free to float with the inner race to compensate for slight variations in length by heat expansion or other causes to which the parts may be subjected. In order to prevent gas or air under compression in the crank chamber 4 from passing between the balls 13 to the outer air I provide the auxiliary heads or covers 25 and 28 having air tight connections with the heads 9 and 10 and secured by means of bolts or screws 30, not shown, on cover 28.

The covers 25 and 28 have cylindrical extensions 31 provided with recesses 32 in the bottom of which is a cup-shaped annular flange 33 loosely fitting the sleeve 19. A series of sealing washers 34 of soft felt or other yielding and porous material, are pressed over the sleeves 19 and into the recesses 32, and a cup-shaped metal collar 35 is loosely inserted in the recesses against the packing washers. A coiled spring 36 is adapted to bear against the collar 35 and pressure is exerted against the spring by means of washers 37 held in place in the recess by a spring clasp 38, fitting a groove in the surrounding wall of the recess. The pressure of the spring 36, acting on the cup-shaped collar 35, compresses the felt washers against the rotating sleeve 19 and the flange 33 and effectually seals the crank case against any leakage of air, gas or oil from the crank chamber to the outer air.

It is obvious that other ball or roller bearings may be adapted to this invention and that various modified constructions of the bearings might be adopted without departing from the principle of the invention.

I claim as my invention:

1. In a gas engine, the combination, with a casing and a crank shaft having an inner shoulder adjacent the crank arms, of anti-friction bearings having an inner and an outer race mounted on said crank shaft and in said casing, a sleeve slidingly fitting upon said crank shaft to rotate therewith, a fly wheel on said shaft abutting said sleeve, threaded means for forcing said fly wheel against the sleeve, and means coöperating with the sleeve for clamping the inner race of the bearing against said shoulder of the crank shaft.

2. In a gas engine, the combination, with a casing and a crank shaft having a shoulder adjacent the crank arm, of anti-friction bearings having inner and outer races mounted on said crank shaft and in said casing respectively, a sleeve slidingly fitted to said crank shaft to rotate therewith, a cylindrical chamber surrounding said sleeve, yielding packing rings arranged upon the sleeve in said chamber, spring-pressed means for forcing said packing rings against the periphery of said sleeve and the walls of said chamber, and threaded means coöperating with the crank shaft and the sleeve for clamping the inner race of the bearing against said shoulder of the crank shaft.

3. In a gas engine, the combination, with a casing and a crank shaft having shoulders adjacent the crank arms, of anti-friction bearings having inner races mounted upon said crank shaft and abutting said shoulders, outer races for said bearings, main housings connected to the casing for said bearings, auxiliary housings connected to said main housings, means connected with said main and auxiliary housings for holding one of said outer races against movement and letting the other float laterally, a cylindrical chamber surrounding said crank shaft in said auxiliary housings, a sleeve slidingly mounted upon said crank shaft within said chamber to rotate with said shaft, packing rings arranged upon said sleeve within said chamber, spring-pressed means for forcing said packing rings against the periphery of said sleeve and against the walls of said chamber, and means coöperating with said crank shaft and said sleeve for forcing the inner races against the shoulders of said crank shaft.

In witness whereof, I have hereunto set my hand this 29 day of March, 1919.

WALTER F. KASPER.

Witness:
JOHN W. LOVELL.